United States Patent Office 3,450,551
Patented June 17, 1969

3,450,551
PROCESS FOR TREATING MOLDS
Richard E. Ware, Trainer, Pa., and Lewis W. Hall, Jr., Claymont, Del., assignors to Sun Oil Company, Philadelphia, Pa., a corporation of New Jersey
No Drawing. Filed Feb. 1, 1966, Ser. No. 523,960
Int. Cl. B28b 7/38; C10m 1/18
U.S. Cl. 117—5.1            4 Claims

ABSTRACT OF THE DISCLOSURE

Concrete and cement mold release compositions which are easy to apply and which are relatively permanent are prepared by dissolving about 5–15 wt. percent of 15,000–30,000 molecular weight atactic polypropylene in a light mineral oil. Such compositions are relatively free flowing at normal temperatures and are easily brushed or sprayed on to the mold surface.

---

The present invention relates to a method for preventing the adherence of materials. More particularly, the invention is directed to the method of preventing an aqueous moldable material from adhering to the mold or form.

The problem of moldable aqueous materials adhering to the mold or form where the moldable material is allowed to harden in the mold or form has been recognized and various mold release agents are current available.

A particular area where this problem has been a serious consideration is the construction industry, which employs large amounts of concrete and cement which are usually poured on site in wooden or metal forms and allowed to harden therein. Presently the mold release compositions employed extensively in the construction industry are water-emulsifiable greases. These compositions present certain disadvantages since they must be applied as aqueous emulsions which require drying prior to use. Moreover, when the forms employed are metal, the presence of water in the mold release compositions tends to create problems in regard to corrosion and oxidation; and when the forms are wooden, some problems with warping and swelling can arise.

These problems are eliminated by the present process and compositions.

It has been found that a blend which is produced by dissolving 5–15 wt. percent atactic polypropylene in particular petroleum mineral oils and then applied to the surface of the mold or form adjacent to the aqueous moldable material, forms a thin coating. The coating has the appearance and feel of an oil film over the entire surface. In the case of unfiltered mold coating composition, the film appears to have small particles of grit in it. The small particles are actually particles of isotactic polypropylene which are insoluble in the petroleum mineral oil at room temperature.

The unique result is that the oil does not run off of a vertical form when applied but remains in place. This is so even though the coating compositon is a relatively free flowing liquid. It is believed that this coating occurs as a result of the formation of a macromolecular film of polymer adhering to the form surface and the oil being occluded in the polymer film.

A further benefit of the present invention is that the intant coatings on the mold or forms are of a somewhat permanent nature so that once a surface is coated, the coating will remain intact, strongly adhered to the surface after repeated use of the mold or form.

The operation of the present invention is quite simple. The petroleum mineral oil-atactic polypropylene composition is applied to the surface of a concrete form, for example, by spraying or brushing. The coating requires no drying time and is ready for use immediately after application. Because of the nature of the film components, i.e., petroleum mineral oil and polypropylene, the coating is hydrophobic. Thus when the aqueous concrete is poured into the form and allowed to harden, there is no bond formed between the concrete and the form, and the form is removed with the coating intact.

The heat generated during the setting of the moldable material is not sufficiently high to cause any damage or change in the coating.

The atactic (essentially noncrystalline) polypropylene is formed during the stereospecific polymerization of propylene. The polymerization takes place in the presence of a catalyst comprising a coordination complex of a transition metal halide with an organometallic compound. The atactic polymer has a viscosity average molecule weight 15% by weight of the polymerization product, the remainder being crystalline or isotactic polypropylene. The atactic polymer has a viscosity average molecular weight of from about 15,000 to about 30,000. It is soluble in boiling pentane, hexane, heptane and other hydrocarbons. The atactic polypropylene suitable for the compositions of the present invention are further characterized in that they have a Brookfield viscosity of from about 1,500 cp. to about 9,000 cp. at 300° F.

In one known process, the polymerization product in the heptane reaction medium is contacted with a solvent consisting of methanol and water to kill the catalyst. The catalyst is then removed in solution leaving behind a heptane slurry. The atactic polypropylene is in solution in the heptane, and this solution is removed from the isotactic polymer. The solution is distilled to recover the heptane solvent which is recycled. The material which remains in the atactic polypropylene empolyed in the compositions of this invention.

The particular petroleum mineral oils employed in the present compositions have viscosities of 45–300 Saybolt Universal seconds at 100° F., API gravity of 22 to 33 degrees at 60° F., flash point of at least 250° F., ASTM color of 4.5–0.25, pour point of at least +5° F. and up to 46 wt. percent gel aromatics. Generally, the petroleum mineral oils employed here consist of normal ($C_{13}$ to $C_{25}$) and branched parafins, mono-, bi- and higher cycloparafins and mono, di and higher nuclear aromatics.

The mold release compositions of the invention can be prepared in batch, continuous or semicontinuous procedures in bench scale, semiworks and commercial quantities, using conventional equipment generally available, as will perform the operations as set out below.

The petroleum mineral oil is heated to about 250° F. (200°–250° F.) in a steam kettle and the atactic polypropylene added to the hot oil with stirring to produce a clear solution. Upon cooling, up to 20 wt. percent of the polypropylene may crystallize out of the oil giving it a cloudy appearance which has no effect on the use of the present compositions as mold release compositions.

The material that crystalizes out of solution is isotactic polypropylene which is included with the atactic in the initial separation of isotactic from atactic polypropylene previously described. It has been found that the solubility of the atactic polypropylene is higher in more aromatic oils but not to a truly significant degree. It has also been observed that the appearance of the mold release compositions can be improved by employing oils having refractive indices similar to that of isotactic polypropylene.

TABLE I

| Oil (1) | Percent arom. | Percent insol. (2) | Percent insol. (3) | Blend visc. (4) Before filt. | Blend visc. (4) After filt. | Percent change in visc. | Appearance of blend |
|---|---|---|---|---|---|---|---|
| A | 11 | 2.1 | 19.1 | 981 | 412 | 58.0 | Cloudy. |
| B | 29 | 1.7 | 15.7 | 347 | 220 | 36.6 | Do. |
| C | 42 | 1.8 | 15.9 | 896 | 497 | 44.5 | Clear. |

(1) See Table IV for properties of oils.
(2) Based on blend weight.
(3) Based on atatic in the blend.
(4) Viscosity units are SUS at 100° F.

All of the atactic-oil blends contain 11 wt. percent atactic polypropylene from the same lot, thus insuring the same constitution for the atactic. As can be seen from Table I, the blend of oil C had nearly 16 wt. percent insolubles but had a clear appearance. The refractive indices for oil C is 1.507 and for isotactic polypropylene 1.49, thus rendering the crystals nearly invisible in the oil.

To determine solids in Table I the blends were each filtered through 80 mesh precoated sintered glass filters after blending and cooling to room temperature.

The atactic polypropylene and petroleum mineral oil as described above are blended within the ranges recited to produce a mold release composition having a viscosity in the range of 300 to 600 Saybolt Universal seconds at 100° F. If desired, the blend may be filtered in order to remove crystallized isotactic polypropylene. The filtering, however, has the effect of reducing the viscosity of the blend. Thus the filtering should either be carried out on blends with high initial viscosities (500–1000 SUS at 100° F.) or carried out only partially in order to produce a final blend having the proper viscosity of 300 to 600 SUS at 100° F.

The final viscosity is quite important, since it is at this viscosity that the mold release compositions are most easily applied to molds and forms over the range of temperatures that are normally encountered in their use.

EXAMPLES 1–4

In order to further demonstrate the compositions of the present invention, the following blends were prepared by adding 10 wt. percent atactic polypropylene crumb to the oil at 250° F. with agitation and subsequent cooling to room temperature. When the compositions produced are unfiltered as in these examples, it is necessary that the atactic polypropylene be characterized by a viscosity average molecular weight of about 15,000 to about 20,000 and Brookfield viscosity of from about 1,500 to 5,000 cp. at 300° F.

TABLE II

| Oil [1] | ASTM color | Oil visc., SUS at 100° F. | Blend [2] visc., SUS at 100° F. |
|---|---|---|---|
| (1) B | 0.25 | 58.1 | 305 |
| (2) B=D-3:1 | 0.25 | 65.4 | 357 |
| (3) B=D-1:1 | 0.50 | 74.6 | 407 |
| (4) B=D-1:3 | 0.75 | 89.2 | 532 |

[1] See Table IV for properties of oils.
[2] The same atactic lot was employed in each example.

All of the compositions from Examples 1–4 were somewhat cloudy after cooling. The mold release compositions are applied by brush to the inside surface of wooden molds having the dimensions 1 x 6 x 2 inches and a quantity of wet cement added to fill the molds. The cement is allowed to dry. After the cement is dry each mold is invert. The cement blocks readily fell from the molds.

The inner surface of the wooden molds still contained what appeared to be gritty oil coatings.

The same test is repeated with the same molds without addition of further mold release composition. The same result occurs and no significant change in the coating on the molds is noted.

EXAMPLES 5–8

The next set of examples show the effect of varying the viscosity of the atactic polypropylene while employing only one oil. The mold release compositions are produced as in Examples 1–4, with the additional step of filtering the cooled blend through an 80 mesh sintered glass filter precoated with Celite 503. The oil employed is B in Table IV.

TABLE III

| Atactic polypropylene, wt. percent | Brookfield visc., cp. at 300° F. | Initial blend visc. SUS 100° F. | Blend after filtering visc. SUS 100° F. |
|---|---|---|---|
| (5) 15 | 1,500 | 601 | 349 |
| (6) 15 | 5,550 | 1,034 | 367 |
| (7) 15 | 9,000 | 3,302 | 467 |
| (8) 11 | 1,500 | 329 | 220 |

Example 8 is given to show that it is possible to produce an unacceptable mold release composition from an acceptable one by over filtration.

When the composition of Examples 5–7 are tested as the compositions of Examples 1–4 in mold release application, the filtered compositions are found to give the same results with no observable difference except that oily films do not have the gritty appearance of those Examples 1–4. The composition of Example 8 was too thin and tended to drain off the sides of the mold. Cement cast in a mold coated with the composition of Example 8 adheres to the mold at some points and the coating is not intact after removal of the cement casting.

At concentrations of greater than 15 wt. percent atactic polypropylene the blends take on grease-like consistency at room temperature.

EXAMPLE 9

A commercial concrete release composition is manufactured by blending ten parts of atactic polypropylene, molecular weight 15–17,000 and Brookfield viscosity of about 1,500 cp. at 300° F. with oil B (oil B can be described as a transformer oil) at 200–210° F. using air and propeller agitation. The hot blend is then passed through an 80 mesh line filter before being packaged. The blend has a viscosity of 305 SUS at 100° F.; however, on standing six weeks, the viscosity increases to 495 SUS. This increase is due to the crystallization of the isotactic polypropylene impurity in the atactic polypropylene and stereo block polymer.

Table IV contains the descriptions and properties of a number of suitable petroleum mineral oils, including those employed in the illustrative examples.

The small differences in surface tensions, which are within experimental error of the test, indicate that there is no improvement in the wetting characteristics of the

TABLE IV.—OIL PHYSICAL PROPERTIES

| Oil | E | A | B | D | C |
|---|---|---|---|---|---|
| Viscosity: | | | | | |
| SUS 100 | 71 | 113 | 58.8 | 110 | 108 |
| SUS 210 | 36.3 | 40 | 34.2 | 38.9 | 38 |
| API Gravity, 60° F | 32.8 | 31.8 | 25.5 | 25.6 | 22.6 |
| Sp. gravity, 60° F | 0.861 | 0.866 | 0.896 | 0.901 | 0.918 |
| Flash/fire, COC, ° F | 345/395 | 380/430 | 295/330 | 350/385 | 320/365 |
| ASTM color | 0.5 | 0.75 | 0.25 | 0.75 | 1.25 |
| Pour point, ° F | +5 | 0 | −(−50) | −45 | −45 |
| Mole wt | | 365 | | 315 | 300 |
| Aniline pt | 200.5 | 210 | 152.0 | 167 | 146 |
| VGC | | 0.810 | | 0.861 | 0.886 |
| RI at 68° F | 1.4721 | 1.4745 | 1.4910 | 1.4938 | 1.5072 |
| Refractive intercept | | 1.0435 | | 1.0453 | 1.0502 |
| Clay gel analysis: | | | | | |
| Asphaltenes | | 0 | | 0 | 0 |
| Polar C | | 0.5 | | 1.0 | 1.13 |
| Aromatic | | 13.5 | | 29.5 | 40.30 |
| Saturates | | 86.0 | | 69.5 | 58.51 |
| Gel aromatic, wt. percent | 10.5 | 11.0 | 29.0 | 30.4 | 42.5 |
| Carbon type analysis: | | | | | |
| Percent $C_A$ | 4 | 4 | 13 | 11 | 21 |
| Percent $C_N$ | 34 | 31 | 43 | 43 | 38 |
| Percent $C_P$ | 62 | 65 | 44 | 46 | 41 |

It has been found that the addition of a surface-active agent to the atactic polypropylene-oil blends produces coatings that will effectively protect metal molds and forms from corrosion for considerably longer periods than blends not containing surface-active agent.

A wide variety of surface-active agents are suitable to obtain the improvement in corrosion protection, such as for example, alkyl aryl sulfonates, mahogany sulfonates, oleic acids, phosphates of long-chain alcohols, polyesters of dibasic acids and oxidized petroleum wax and the like.

EXAMPLE 10

Various commercial surface-active agents were added to a blend of 10 parts by weight atactic polypropylene having Brookfield viscosity of 1,500 cp. and 90 parts by weight of oil B (see Table IV). The surface tension of each run was measured in order to determine if the wetting characteristics of the blend were improved. The corrosion protection was determined according to ASTM D1748-62T. In this test 2 by 4 inch sandblasted panels of steel were dip-coated in the composition to be tested and suspended in a humidity cabinet, which is maintained at 120° F.±2. The panels were tested for hours-to-failure. In order to make this type of evaluation, the coated steel panels were removed from the humidity cabinet once a day and examined for rust spots. The panels passed or failed as indicated in ASTM D1748-62T.

TABLE V

| Coating materials | Hour-to-failure, hours | Surface [9] tension, dynes/cm. |
|---|---|---|
| Oil B (Table IV) | 18 | 32.7 |
| Mold release composition [1] | 18 | 33.1 |
| Filtered [2] | 29 | 33.0 |
| Added surface active agents—wt. percent agents: | | |
| 0.5 Plexol 305 [3] | 72 | 33.0 |
| 1.0 Plexol 305 | 90 | 33.0 |
| 1.0 Emersol 220 [4] | 96 | 33.1 |
| 0.5 Ortholeum 162 [5] | 96 | 32.8 |
| 1.0 Ortholeum 162 | 426 | 32.8 |
| 0.5 Na-Sul BSN [6] | 118 | 32.5 |
| 1.0 Na-Sul BSN | 118 | 32.6 |
| 1.0 Sun Sodium Sulfonate [7] | 118 | 32.6 |
| 1.0 Sun S7S [8] | 66 | 32.8 |

[1] 10 parts by weight atactic polypropylene, 90 parts by weight Oil B (Table IV).
[2] Blend of (1) allowed to cool to room temperature then filtered through precoated sintered glass filter.
[3] Diesters of sebaric and other dibasic acids—Rohm & Haas Co.
[4] Oleic acids, Titer °C. 8-11, Iodine No. 90-93, Acid No. 195-201, Saponification No. 197-203—Emery Industries, Inc.
[5] A phosphate of long-chain alcohols. A light brown viscous liquid freezing point of about 15° C.—E. I. du Pont de Nemours & Co.
[6] Neutral barium dinonyl naphthalene sulfonate—R. T. Vanderbilt Co.
[7] Mahogany sulfonates—Sun Oil Co.
[8] Oxidized petroleum wax—Sun Oil Co.
[9] Measurements determined at 77° F.

blend by addition of the surface-active agent. Just as apparent, however, is the greatly increased corrosion and rust protection achieved by addition of a surface-active agent.

The improvement in corrosion and rust protection for the blends containing surface-active agents is attributed to the surface-active agent suspending in the coating composition any moisture on the surface of the steel, thus allowing the coating compositions to coat an essentially absolutely dry surface by essentially complete contact with the surface.

The examples presented herein are intended to be merely illustrative and are not intended to limit the scope of the claims. Certain ranges of components have been specified and it is to be understood that those of skill in the art will be able to select the respective proportion from each range so as to produce compositions within the spirit and scope of the invention. The examples provide the guidelines to indicate to those of skill in the art the means and manner of component selection and compounding.

The invention claimed is:

1. The method of preventing an aqueous moldable material from adhering to a molding surface which comprises applying to said molding surface an adhering protective coating, said coating comprising a blend of a minor amount of atactic polypropylene having a viscosity average molecular weight of from about 15,000 to about 30,000 and a Brookfield viscosity of from about 1,500 centipoises to about 9,000 centipoises at 300° F. and a petroleum mineral oil having a viscosity of 45 to 300 Saybolt Universal seconds at 100° F., API gravity of 22 to 33 degrees at 60° F., flash point of at least 250° F., pour point of at least +5° F., said blend having a viscosity of 300 to 600 SUS at 100° F., and said atactic polypropylene being substantially in solution.

2. The method of claim 1 wherein the atactic polypropylene has a viscosity average molecular weight of from about 15,000 to about 20,000 and a Brookfield viscosity of from about 1,500 centipoises to about 5,000 centipoises at 300° F.

3. The method of claim 1 wherein the atactic polypropylene comprises 5 to 15 weight percent of the total composition.

4. The method of claim 2 wherein the atactic polypropylene comprises 5 to 15 weight percent of the total composition.

(References on following page)

References Cited

UNITED STATES PATENTS

| | | | |
|---|---|---|---|
| 2,564,308 | 8/1951 | Nagel | 117—5.1 |
| 2,851,330 | 9/1958 | Taylor | 117—5.3 X |
| 2,902,376 | 9/1959 | Beacher et al. | 106—10 |
| 2,923,041 | 2/1960 | Ryznar | 117—5.3 X |
| 2,982,759 | 5/1961 | Heuse | 260—23.5 X |
| 3,139,412 | 6/1964 | Sterling | 260—23 |
| 3,240,618 | 3/1966 | Hemming | 117—5.1 |
| 3,253,932 | 5/1966 | Whik et al. | 117—5.3 |

WILLIAM D. MARTIN, *Primary Examiner.*

PAUL ATTAGUILE, *Assistant Examiner.*

U.S. Cl. X.R.

106—38.22; 117—5.3; 260—23.5